(12) United States Patent
Moon et al.

(10) Patent No.: US 9,583,224 B2
(45) Date of Patent: Feb. 28, 2017

(54) PASSIVE SAFETY SYSTEM OF INTEGRAL REACTOR

(71) Applicant: KOREA ATOMIC ENERGY RESEARCH INSTITUTE, Daejeon (KR)

(72) Inventors: Joo Hyung Moon, Dajeon (KR); Won Jae Lee, Gongju-si (KR); Keung Koo Kim, Daejeon (KR); Cheon Tae Park, Daejeon (KR); Young In Kim, Daejeon (KR); Sung Kyun Zee, Daejeon (KR); Keun Bae Park, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 1047 days.

(21) Appl. No.: 13/939,547

(22) Filed: Jul. 11, 2013

(65) Prior Publication Data
US 2014/0016734 A1    Jan. 16, 2014

(30) Foreign Application Priority Data
Jul. 13, 2012   (KR) .................. 10-2012-0076752

(51) Int. Cl.
G21C 15/18    (2006.01)
G21C 1/32     (2006.01)

(52) U.S. Cl.
CPC ............... *G21C 15/18* (2013.01); *G21C 1/32* (2013.01); *Y02E 30/40* (2013.01)

(58) Field of Classification Search
CPC ..................................................... G21C 15/18
(Continued)

(56) References Cited

U.S. PATENT DOCUMENTS 4,753,771 A * 6/1988 Conway ................. G21C 15/18
                                                    376/282
5,085,825 A * 2/1992 Gluntz ................... G21C 15/18
                                                    376/282
(Continued)

FOREIGN PATENT DOCUMENTS

JP              2977234        11/1999
KR         1020020037105        5/2002
(Continued)

OTHER PUBLICATIONS

Kwon et al., "Hybrid High Pressure Safety Injection Tank for SBO" Transactions of the Korean Nuclear Society Spring Meeting, May 2011.*

(Continued)

*Primary Examiner* — Jack W Keith
*Assistant Examiner* — Sharon M Davis
(74) *Attorney, Agent, or Firm* — Cantor Colburn LLP

(57) ABSTRACT

A passive safety system includes a containment, a reactor in the containment, a plurality of safety injection tanks connected with the reactor and having water and nitrogen gas to supply water thereof into the reactor through a safety injection line communicating to the first safety injection line upon a loss of coolant accident, a plurality of core makeup tanks connected with the reactor to supply water thereof into the reactor through a second safety injection line communicating to a safety injection line upon the loss of coolant accident, and a plurality of passive residual heat removal systems to remove residual heat from the reactor upon the loss of coolant accident or a non-loss of coolant accident. The water in each of the safety injection tank is stably supplied to the reactor for many hours by a differential head resulting from gravity or gas pressure.

10 Claims, 13 Drawing Sheets

(58) Field of Classification Search
USPC .......................................................... 376/282
See application file for complete search history.

(56) References Cited

U.S. PATENT DOCUMENTS

| | | | | |
|---|---|---|---|---|
| 5,180,543 | A * | 1/1993 | Conway | G21C 15/18 |
| | | | | 376/282 |
| 8,559,583 | B1 * | 10/2013 | Sato | G21C 1/086 |
| | | | | 376/282 |

FOREIGN PATENT DOCUMENTS

| | | |
|---|---|---|
| KR | 100813939 | 3/2008 |
| KR | 100856501 | 8/2008 |

OTHER PUBLICATIONS

Kwon et al., "Gravity Driven Injection Velocity of Hybrid SIT" Transactions of the Korean Nuclear Society Autumn Meeting, Oct. 2011.*

Hee-Cheol Kim et al., Development of Design Technology for Integral Reactor, Korea Atomic Energy Research Institute, 2002.

\* cited by examiner (a) safety injection flow rate (b) water level in reactor vessel (a) safety injection flow rate (b) water level in reactor vessel (a) safety injection flow rate (b) water level in reactor vessel

PASSIVE SAFETY SYSTEM OF INTEGRAL REACTOR

BACKGROUND OF THE INVENTION

1. Field of the Invention

The present invention relates generally to a passive safety system of an integral reactor, and more particularly to a passive safety system of an integral reactor, which includes a passive safety injection system (core makeup tank and safety injection tank) and a passive residual heat removal system.

In more detail, the present invention relates to a passive safety system capable of safely protecting a reactor by removing residual heat and maintaining a core water level in a reactor by using natural force such as gas pressure or gravity without active equipment such as a safety injection pump, which requires power supply, or a facility such as a safeguard vessel for a considerable amount of time at which the residual heat emitted from a reactor core is significantly reduced.

2. Description of the Related Art

Different from a typical industrial power plant, a nuclear power plant generates residual heat from a reactor core for a considerable amount of time after a reactor has been shutdown, and an amount of the residual heat is rapidly reduced by lapse of time. Accordingly, the nuclear power plant has various safety facilities to remove the residual heat from the reactor core and to ensure safety upon an accident.

Among several safety facilities, there are a safety injection system and a residual heat removal system as main systems to ensure the integrity of the core. The safety injection system complements a coolant when the coolant of the reactor is lost due to the loss of coolant accident such as the break of a line connected with the reactor, and the residual heat removal system removes sensible heat and residual heat of the reactor after the reactor core has been shutdown.

A passive reactor of a commercial reactor (loop type pressurized water reactor) includes a core makeup tank (high pressure safety injection), a pressurized-type safety injection tank (intermediate pressure safety injection), and an in-containment refueling water storage tank (low pressure safety injection). An active reactor of the commercial reactor includes a high pressure safety injection pump (high pressure safety injection), a pressurized-type safety injection tank (intermediate pressure safety injection), and a low pressure safety injection pump (low pressure safety injection, integrated into high pressure safety injection pump lately.

The safety injection tank applied to the commercial reactor is a device to rapidly supply cooling water into the reactor by using the pressurized nitrogen gas in the safety injection tank when the internal pressure of the reactor is rapidly reduced due to the large loss of coolant accident. In other words, the safety injection tank is designed to cope with the large loss of coolant accident. The safety injection tank is a facility to create the margin of time until coolant is actually injected at a safety injection flow rate from a gravity-driven passive safety injection system or a high pressure safety injection pump, and the safety injection tank is used for a short time (about 1 minute to 4 minutes after actuated).

Accordingly, when the pressure of the reactor is rapidly reduced due to the large loss of coolant accident in the active reactor, the safety injection system of the active reactor is actuated in the sequence of "pressurized-type safety injection tank→high pressure safety injection pump". When the pressure of the reactor is slowly reduced due to a small loss of coolant accident in the active reactor, the safety injection system of the active reactor is actuated in the sequence of "high pressure safety injection pump→pressurized-type safety injection tank".

When the large loss of coolant accident or the small loss of coolant accident occur in the passive reactor, the passive safety injection system has the same actuating sequence of "core makeup tank→pressurized-type safety injection tank→in-containment refueling water storage tank" in the two cases. However, since a gravity tank such as the core makeup tank has a low gravitational head, an injection flow rate is low. Accordingly, in the initial stage of the large loss of coolant accident, an injection flow rate of the pressurized-type safety injection tank occupies most parts of a safety injection flow rate. In addition, an automatic depressurization system having a multi-stage structure is installed in a passive reactor (AP1000 in the U.S., loop type reactor) to rapidly lower the pressure of the reactor so that the reactor and the containment make pressure balance in an early stage to smoothly perform gravity safe injection (in-containment refueling water storage tank).

In addition, the passive residual heat removal system removes the sensible heat of the reactor and the residual heat of the core upon an accident. The main cooling water circulating schemes of the passive residual heat removal system include a scheme of directly circulating primary cooling water and a scheme (SMART reactor in Korea) of circulating secondary cooling water by using a steam generator. In addition, a scheme of injecting the primary cooling water into a cooling tank and directly condensing the primary cooling water (AP1000, Nuscale in the U.S.) is partially used.

In addition, emergency core cooling schemes using a safeguard vessel, a pressurized-type safety injection tank, and a passive residual heat removal system in relation to an integral reactor are disclosed in Korean Patent Registration Nos. 10-419194, 10-856501, and 10-813939 issued on Feb. 5, 2004, Aug. 28, 2008, and Mar. 10, 2008, respectively. A reactor having a similar concept, in which a safeguard vessel is applied, has been developed (IRIS, Nuscale in the U.S.).

However, since the safeguard vessel is a pressure vessel that is smaller than a containment building (a containment vessel or a reactor building) but larger than a reactor, the safeguard vessel has a great difficulty in solving problems related to the manufacturing and the transporting of the vessel, the long term of construction works, the integrity of a device installed in the safeguard vessel under a high temperature and high pressure environment upon a loss of coolant accident, and the convenience in refueling and maintenance.

In a core makeup tank, a pressure balance line is connected with a high-temperature line, and an isolation valve is mounted on a safety injection line. The core makeup tank has the same design pressure of the reactor. Accordingly, when the tank is manufactured in large size for the purpose of usage for many hours, the manufacturing cost is greatly increased, and the pressure boundary of the reactor is expanded. In addition, since the safety injection tank is similar to that of the loop type active reactor, the safety injection tank is insufficient for the purpose of the usage for many hours.

In addition, different from the loop type reactor, since an integral reactor fundamentally eliminates a large loss of coolant accident, the reactor is maintained under the high pressure for many hours when the loss of coolant accident occurs. Accordingly, the integral reactor has a difficulty in injecting external cooling water into the integral reactor by gravity without increasing the external pressure of the reactor (pressure balance) through a safeguard vessel.

Further, in a passive residual heat removal system to cool a primary system of the reactor through a direct circulation scheme, the pressure boundary of the primary system is expanded to a condensation heat exchanger in actuation, so that the condensation heat exchanger must be installed in the containment. Accordingly, the containment must be designed to serve as an ultimate heat sink in the final stage. As described above, since the pressurized-type safety injection tank applied to the commercial reactor must be designed at higher pressure, the manufacturing cost of the pressurized-type safety injection tank is greatly increased, and the safety injection is finished early (in the range from several tens of seconds to several minutes), so that the pressurized-type safety injection tank is not suitable for the integral reactor that must be actuated for many hours.

In addition, the active safety system has a difficulty in ensuring the reliability of a power supply system to actuate the above systems.

SUMMARY OF THE INVENTION

Accordingly, the present invention has been made to solve the above problems, and an object of the present invention is to provide a passive safety system of an integral reactor, which adopt the combination of advantages of a core makeup tank, and a pressurized-type safe injection tank, a pressure balance-type (back pressure-type or gravity-type) safe injection tank, or a mixed-type safe injection tank, and a passive residual heat removal system.

Another object of the present invention is to provide a passive safety system, capable of enhancing the safety of a reactor by removing residual heat from the reactor and maintaining the water level in the rector by using natural force such as gas pressure or gravity existing in the system for a considerable amount of time at which the residual heat is significantly reduced after an accident satisfying conditions of a design basis accident without an operator's action even if an external AC power supply system and an emergency diesel generator are not available upon the design basis accident.

Still another object of the present invention is to provide a passive safety system capable of stably supplying water from a safety injection tank to a reactor by using a differential head resulting from gravity or gas pressure by connecting a safety injection tank to the reactor without installing a safeguard vessel.

Still yet another object of the present invention is to provide a passive safety system including a passive safety injection system, which can stably supply water stored in a core makeup tank to the reactor by using a differential head, and a passive residual heat removal system to remove residual heat from the reactor.

To accomplish these objects, the present invention provides a passive safety system of an integral reactor. The passive safety system includes a containment, a reactor installed in the containment, a plurality of safety injection tanks that are connected with the reactor through a safety injection line communicating to a first safety injection line, filled therein with water and nitrogen gas, and supplies the water into the reactor through the safety injection line communicating to the first safety injection line when a water level in the reactor is lowered due to a loss of coolant accident, a plurality of core makeup tanks that are connected with the reactor through the safety injection line communicating to a second safety injection line, stores water therein, and supplies the water into the reactor through the second safety injection line communicating to the safety injection line when the water level in the reactor is reduced upon the loss of coolant accident, and a plurality of passive residual heat removal systems connected with a feedwater line and a steam line connected with a steam generator installed in the reactor to remove residual heat from the reactor upon the loss of coolant accident or the non-loss of coolant accident.

As described above, according to the passive safety system of an integral reactor of the present invention, facilities can be simplified since a safeguard vessel or an active pump is not necessary. In addition, upon an accident, water stored in the core makeup tank is supplied into the reactor by using a differential head resulting from gravity, the safety injection tank is connected with the reactor, so that the water in the safety injection tank is supplied into the reactor by the differential head resulting from gravity or gas pressure, thereby stably maintaining the water level in the reactor for many hours.

In addition, according to the passive safety system of the integral reactor of the present invention, the passive residual heat removal system is employed together, so that core residual heat can be stably removed for many hours upon an accident.

In addition, according to the passive safety system of the reactor of the present invention, the main safety system to maintain the integrity of the core is realized in a passive type, so that the safety of the nuclear power plant can be greatly improved.

DETAILED DESCRIPTION OF THE INVENTION

The above and other objects, novel features and other advantages of the present invention will be more clearly understood from the following detailed description and accompanying drawings.

Hereinafter, the structure of the present invention will be described with reference to accompanying drawings.

The safety injection systems and the passive residual heat removal system (core makeup tank and safety injection tank) according to the invention may be provided as plural. Unless indicated otherwise, the safety injection system and the passive residual heat removal system may not exclude the meaning of plural.

Figure 1:
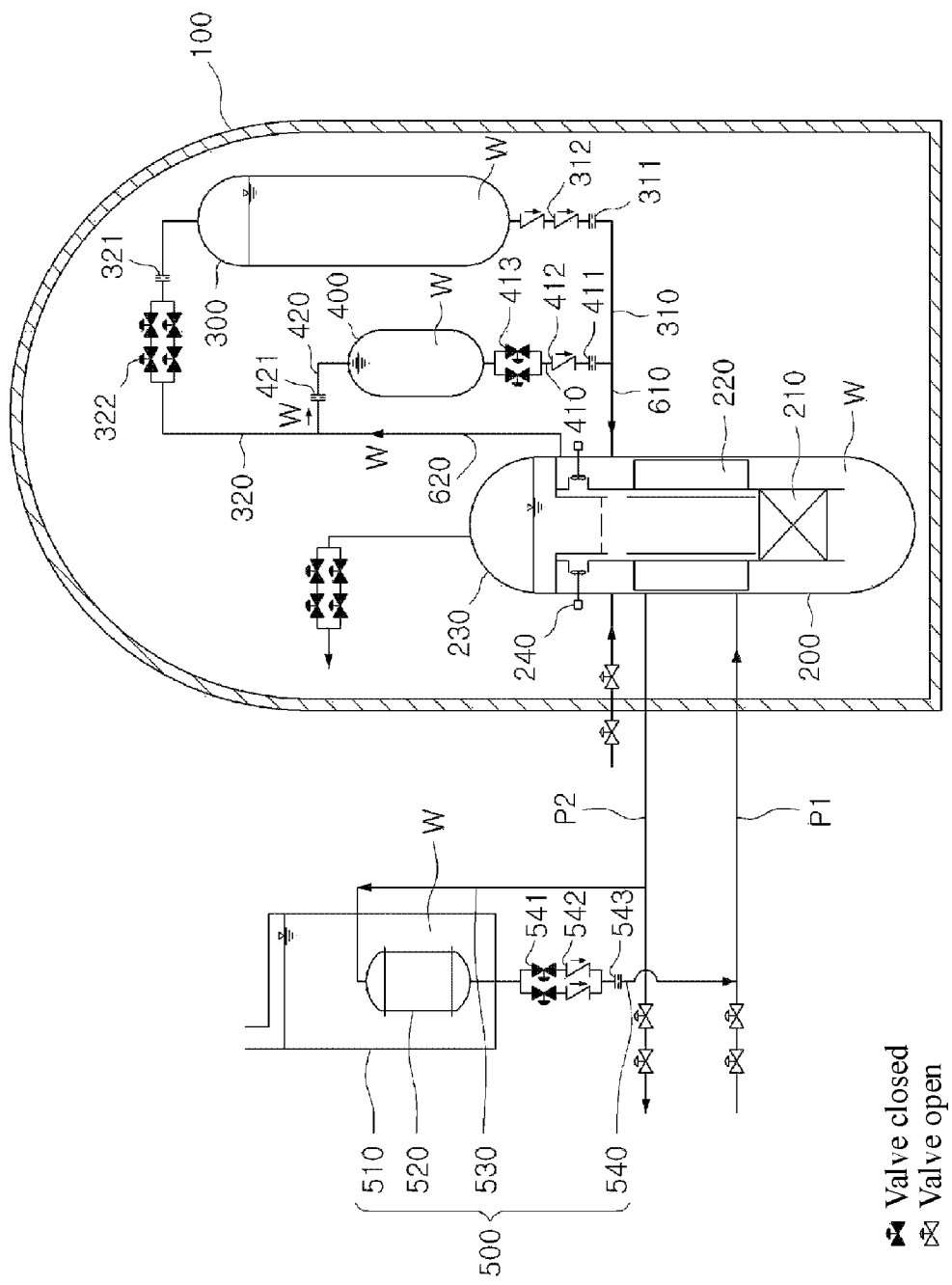
FIG. 1 is a view showing an example of applying a core makeup tank and a pressure balance-type safety injection tank in a passive safety system of an integral reactor according to the present invention when the reactor is normally actuated.
Figure 2:
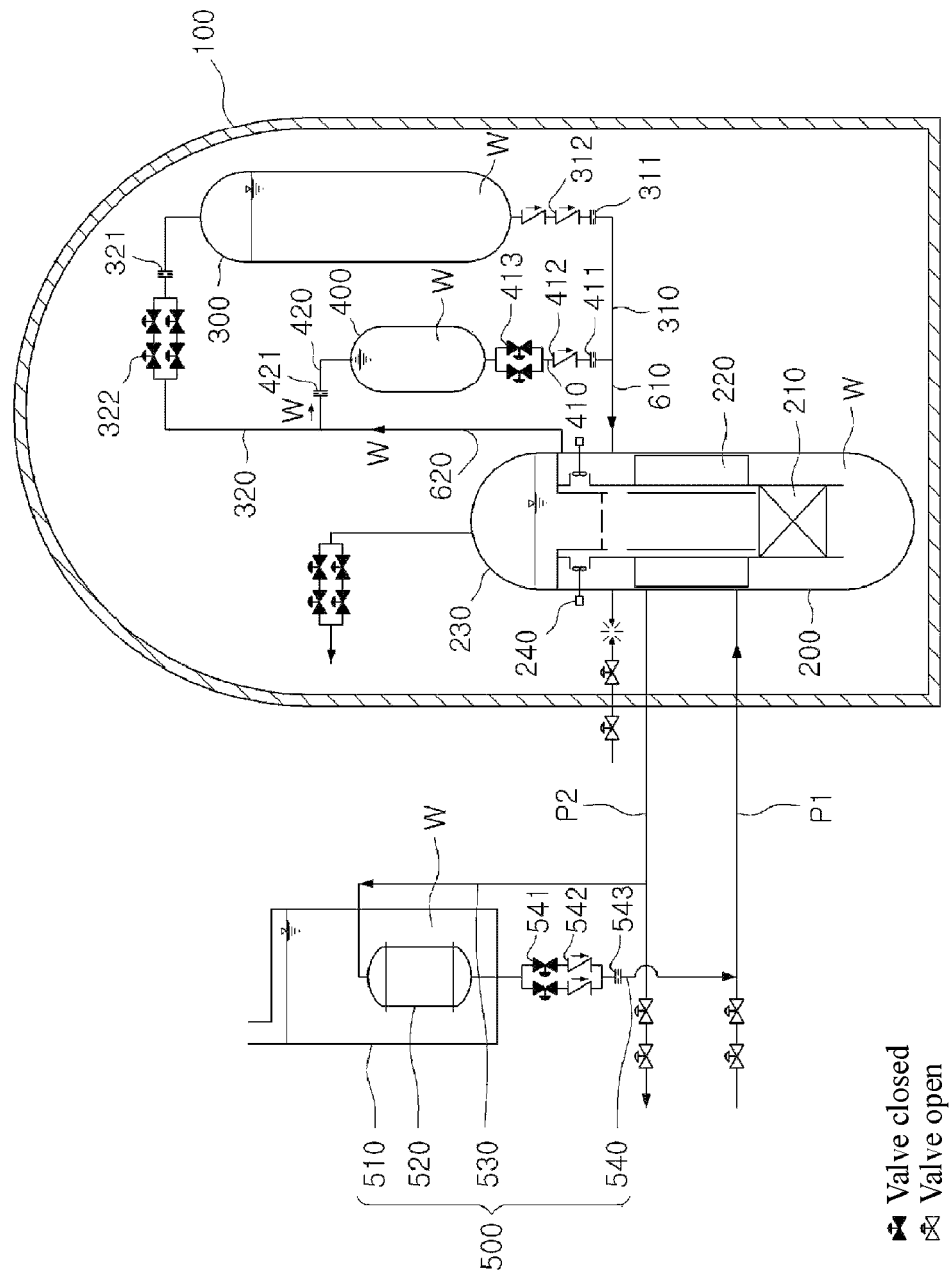
FIGS. 2 to 7 are views showing the actuating procedure of the passive safety system of the integral reactor of FIG. 1 according to the present invention when a loss of coolant accident occurs.
Figure 3:
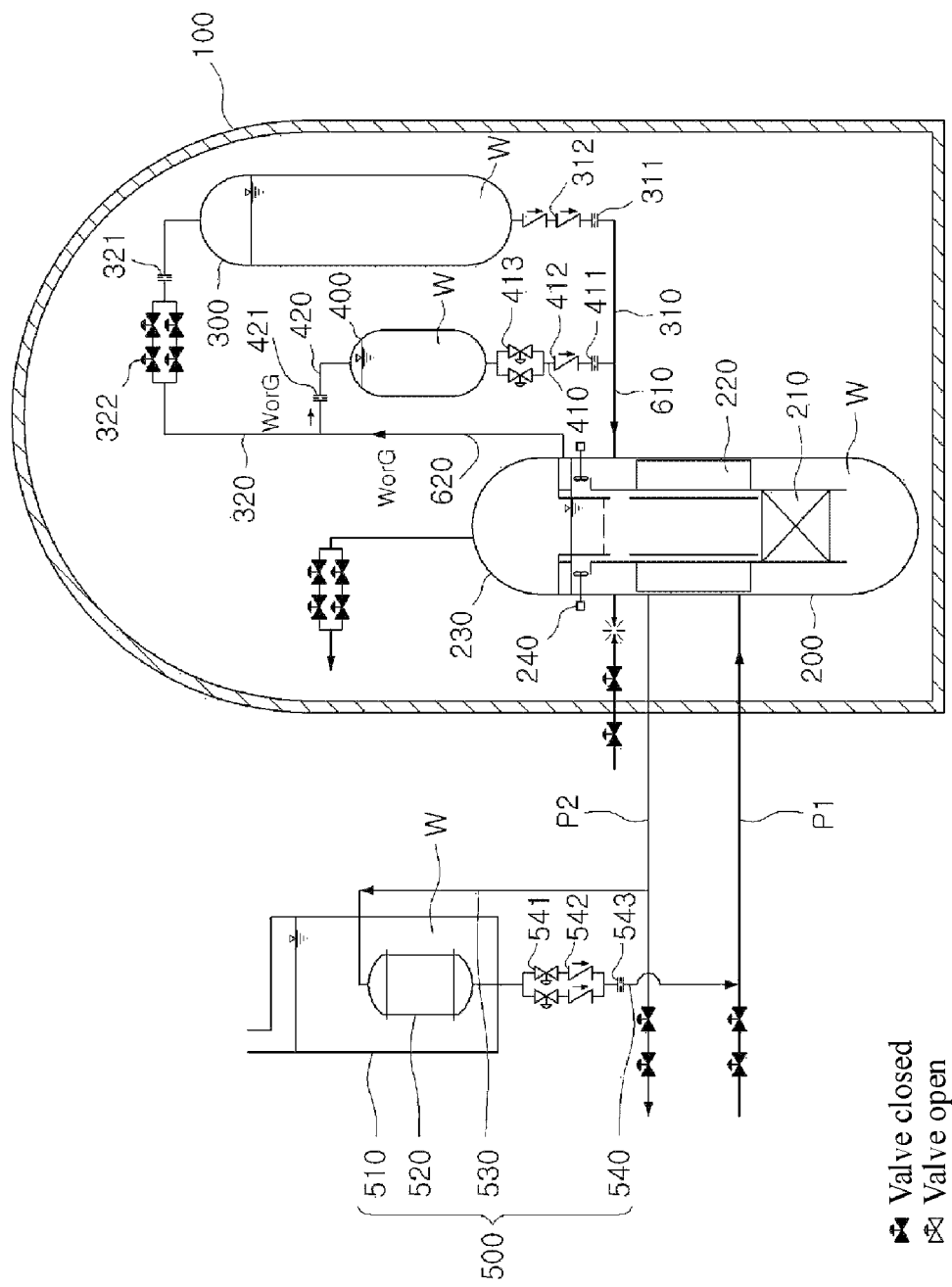
Figure 4:
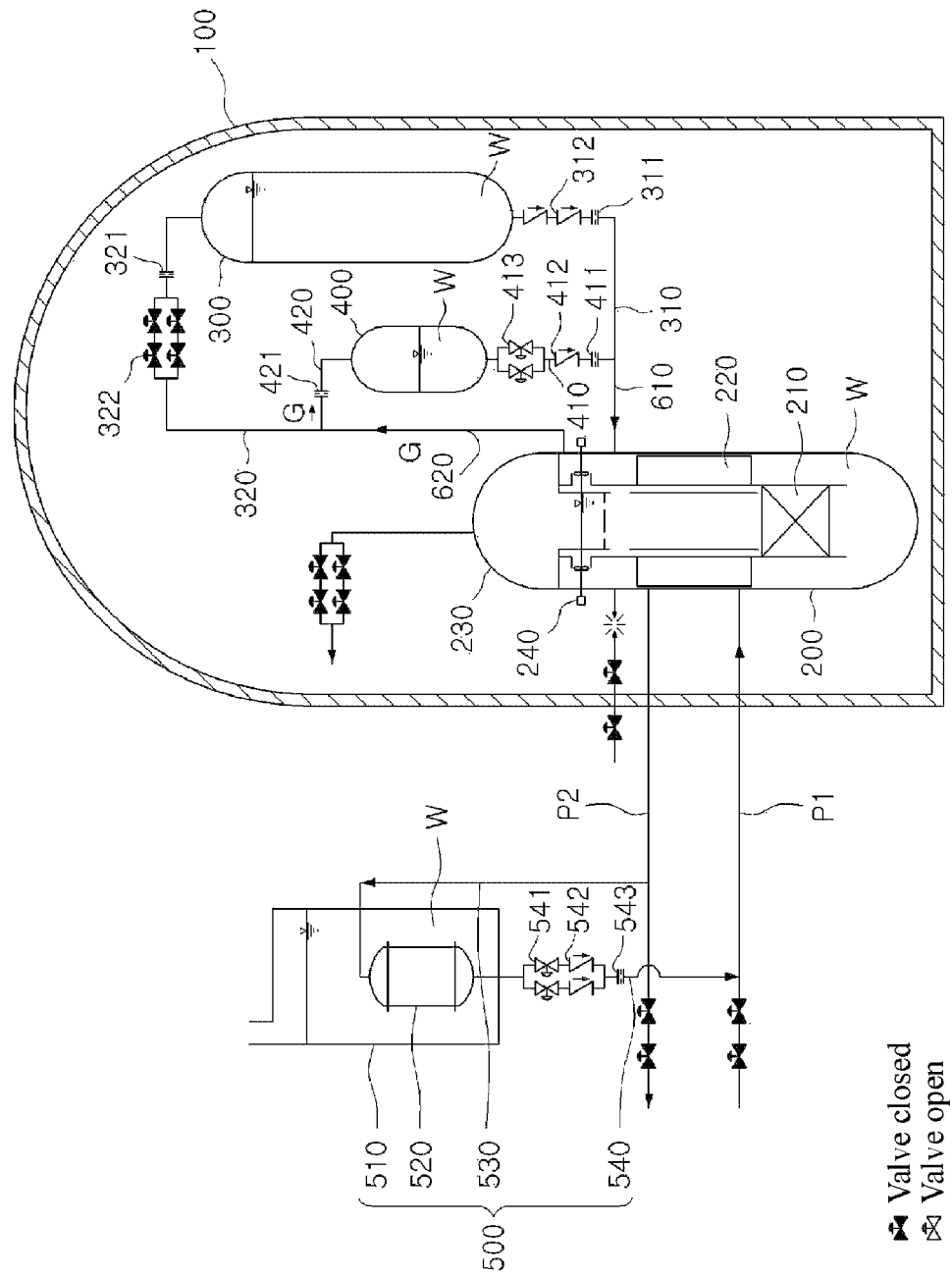
Figure 5:
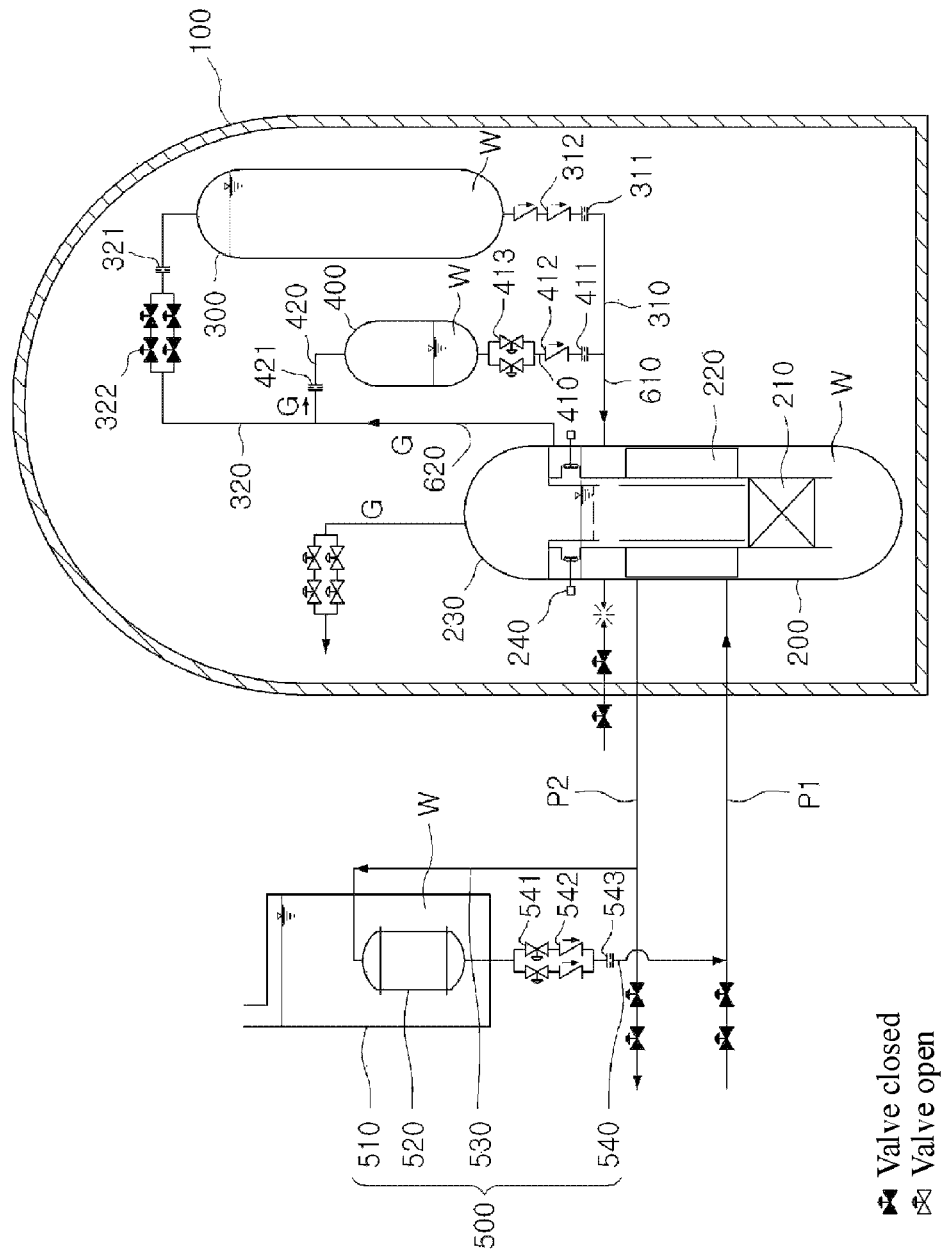
Figure 6:
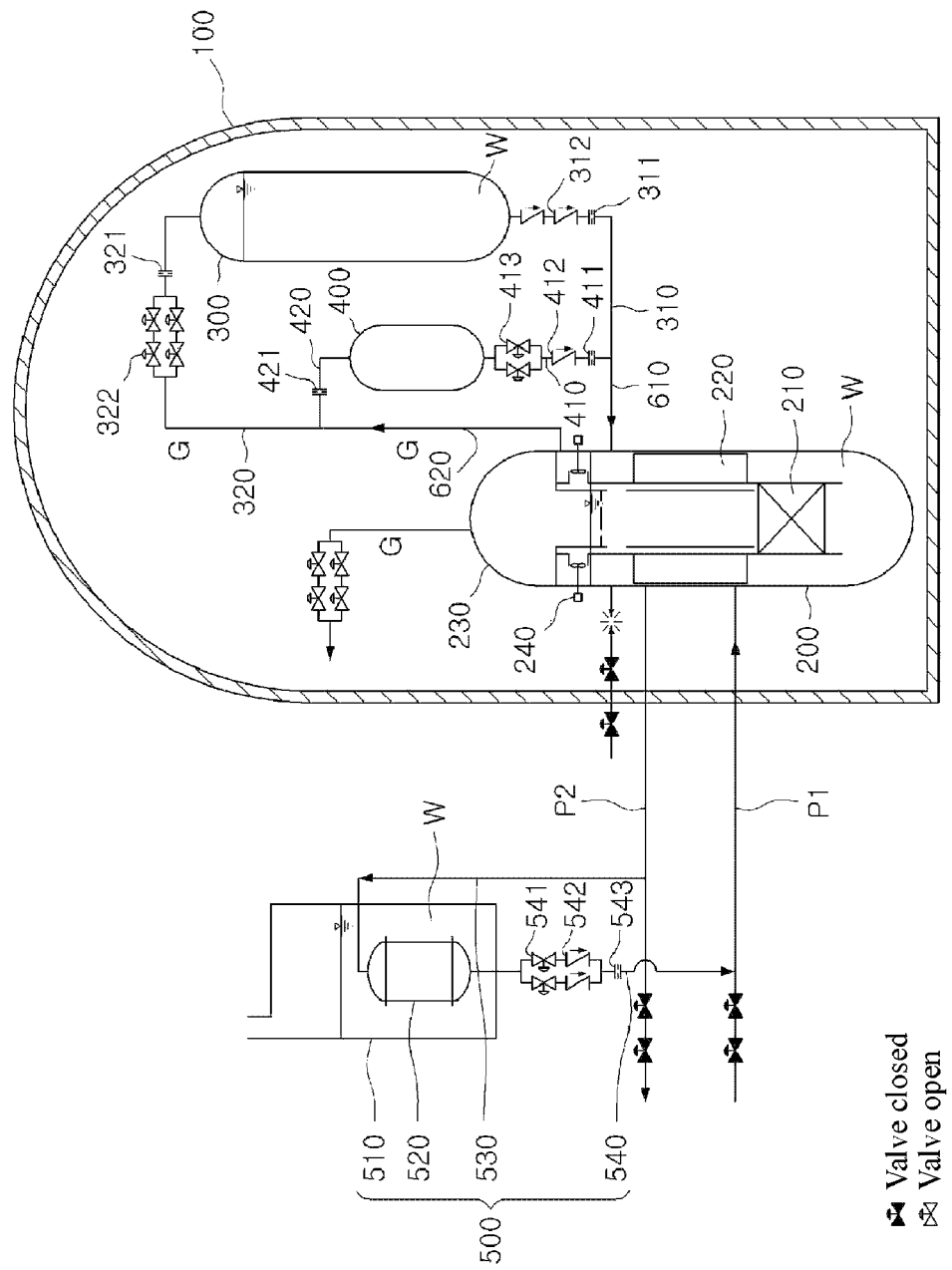
Figure 7:
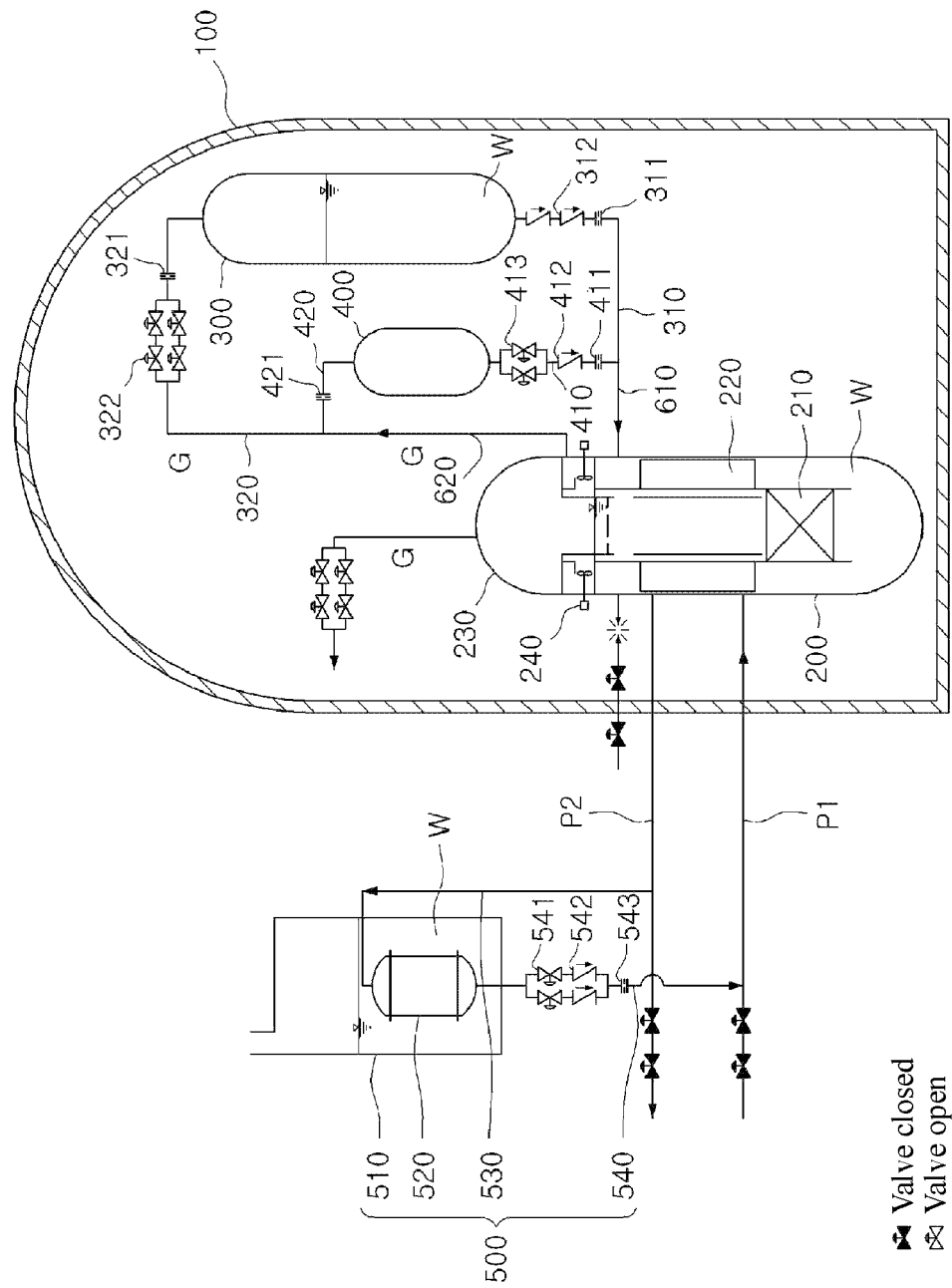

FIG. 1 is a view showing an example of applying a core makeup tank and a pressure balance-type safety injection tank in a passive safety system of an integral reactor according to the present invention. FIGS. 2 to 7 are views showing the actuating procedure of the passive safety system of the integral reactor of FIG. 1 according to the present invention when a loss of coolant accident occurs.

The passive safety system of the integral reactor according to the present invention includes a containment 100, a reactor 200 installed in the containment 100, a plurality of safety injection tanks 300 installed in the containment 100, a plurality of core makeup tanks 400 installed in the containment 100, and a plurality of passive residual heat removal systems 500 installed outside the containment 100. In some cases, the safety injection tanks 300 may be installed outside the containment according to the requirements of a nuclear power plant.

The containment 100 is a facility to prevent more than the regulatory limit of radioactive materials from being discharged into the environment beyond a controlled area upon a reactor accident.

The reactor 200 shown in FIG. 1 includes main devices such as a core 210, steam generators 220, a pressurizer 230, and impellers of reactor coolant pumps 240, which are installed in a reactor vessel. The reactor vessel contains a large amount of cooling water W therein. The reactor 200 is not only connected with a feed water line P1 and a steam line P2, which are connected with a secondary system through a steam generator, but also connected with various lines related to a chemical and volume control system directly connected with the primary system of the reactor.

Each of the safety injection tanks 300 is connected with the reactor 200 through a safety injection line 610 communicating to a first safety injection line 310 and a pressure balance line 620 communicating to a first pressure balance line 320. The safety injection tank 300 is filled therein with water W and gas. The gas filled in safety injection tank 300 generally is nitrogen gas. The first pressure balance line 320 may not be installed according to the requirements of the nuclear power plant. The first pressure balance line 320 allows safety injection by using a differential head resulting from gravity. If related facilities such as the first pressure balance line 320, an orifice 321, and isolation valves 322 are not installed, the safety injection tank 300 is actuated due to a pressure difference resulting from gas pressure.

The first safety injection line 310 has one end connected with the safety injection line 610 coupled with an upper part of the reactor 200 and an opposite end coupled with the safety injection tank 300. If the loss of coolant accident occurs due to an accident such as line break, the water level in the reactor 200 is reduced. Since the amount of cooling water is insufficient to drop the temperature of the core 210 of the reactor 200 if the water level in the reactor 200 is lowered, the water stored in the safety injection tank 300 is supplied into the reactor 200 in order to overcome the lack of the cooling water. In other words, the water stored in the safety injection tank 300 flows into the reactor 200 through the safety injection line 610 communicating to the first safety injection line 310.

An orifice 311 is mounted on the above first safety injection line 310. The orifice 311 increases the flow resistance of the first safety injection line 310 to adjust a flow rate of water so that the water W stored in the safety injection tank 300 may slowly flow into the reactor 200.

In addition, check valves 312 are mounted on the first safety injection line 310 to prevent backward flow from the reactor 200 to the safety injection tank 300.

The first pressure balance line 320 communicating to the pressure balance line 620 connects the pressure balance line 620 with the safety injection tank 300, and has one end connected with the pressure balance line 620 and an opposite end coupled with an upper part of the safety injection tank 300. The opposite end of the pressure balance line 620 connects an upper part of the reactor 200 with a second pressure balance line 420.

Accordingly, if the loss of coolant accident occurs, the high-temperature steam G generated from the reactor 200 flows along the pressure balance line 620 and the first pressure balance line 320 so that the high-temperature steam G is supplied into the safety injection tank 300.

The orifice 321 is mounted on the first pressure balance line 320 to relieve the excessive pressure fluctuation when the high-temperature steam G flows therein from the reactor 200 and to accommodate the variation of the flow resistance of a line depending on the arrangement of the line and valves, so that the line can be easily designed.

The isolation valves 322 are mounted on the first pressure balance line 320. The isolation valves 322 are closed when the reactor 200 is normally actuated. In this state, if the loss of coolant accident occurs so that the pressure of the rector 200 is reduced to a set point or less for the operation of the isolation valves 322, the isolation valves 322 are automatically open. If the closed isolation valves 322 are open, the high-temperature steam G generated from the reactor 200 is supplied into the safety injection tank 300. Two isolation valves 322 may be mounted on two branch lines connected with the first pressure balance line 320 in such a manner that the isolation valves 51 may be operated independently. Accordingly, the single failure of isolation valves can be taken into consideration, and the closing and the opening of the isolation valves 322 can be ensured. Total four isolation valves 322 mounted on the first pressure balance line 320 may be open or closed by backup power from a battery in case of the loss of power.

Each of the core makeup tanks 400 is connected with the reactor 200 through the safety injection line 610 communicating to a second safety injection line 410 and the pressure balance line 620 communicating to the second pressure balance line 420. The core makeup tank 400 is installed higher than a line connection part of the reactor 200, so that the water stored in the core makeup tank 400 is supplied into the reactor 200 due to the differential head resulting from gravity.

The second safety injection line 410 has one end coupled with a lower end of the core makeup tank 400 and an opposite end communicating to the safety injection line 610. The second pressure balance line 420 has one end coupled with an upper end of the core makeup tank 400 and an opposite end coupled with the pressure balance line 620.

Accordingly, upon the loss of coolant accident or the non-loss of coolant accident, the water W stored in the core makeup tank 400 is supplied into the reactor 200 through the safety injection line 610 communicating to the second safety injection line 410, and the high-temperature steam G or the water from the reactor 200 is supplied into the core makeup tank 400 through the pressure balance line 620 communicating to the second pressure balance line 420.

The second safety injection line 410 is mounted thereon with an orifice 411 and a check valve 412. The orifice 411 increases the flow resistance of the second safety injection line 410 to adjust a flow rate of the water W stored in the core makeup tank 400 so that the water W stored in the core makeup tank 400 may suitably flow into the reactor 200.

The check valve 412 is mounted on the second safety injection line 410 to prevent the water W from flowing back from the reactor 200 to the core makeup tank 400.

Meanwhile, isolation valves 413 are mounted on the second safety injection line 410.

The isolation valves 413 are in a closed state when the reactor 200 is normally operated. If the loss of coolant accident or the non-loss of coolant accident occurs so that the pressure of the reactor 200 is reduced to a set point or less for the operation of the isolation valves 413, the isolation valves 413 are automatically open. If the closed isolation valves 413 are open, the high-temperature water W or steam G from the reactor 200 is supplied into the core makeup tank 400, and boric acid solution, that is, the water W stored in the core makeup tank 400 is supplied into the reactor 200.

The second pressure balance line 420 may be mounted thereon with the orifice 421. The orifice 421 is mounted on the second pressure balance line 420 to relieve the excessive pressure fluctuation when the high-temperature steam G or water W flows from the reactor 200 into the core makeup tank 400, and to accommodate the flow resistance design.

Each of the passive residual heat removal systems 500 communicates to the feedwater line P1 and the steam line P2 connected with each of the steam generators 220 installed in the reactor 200 to remove sensible heat and residual heat from the reactor 200 upon the accident. The passive residual heat removal system 500 includes an emergency cooling tank 510, a condensation heat exchanger 520, a steam inlet line 530, and a water drain line 540.

The emergency cooling tank 510 stores water W therein to remove the heat transferred into by a condensation heat exchanger 520 to the environment, that is, ultimate heat sink upon the accident.

The condensation heat exchanger 520 is installed in the emergency cooling tank 510 to receive high-temperature steam G generated from the steam generator 220 through the steam line P2 and the steam inlet line 530 and to condense the high-temperature steam G into water.

The steam inlet line 530 has one end coupled with the steam line P2 and an opposite end coupled with an upper part of the condensation heat exchanger 520. Accordingly, the steam inlet line 530 receives the high-temperature steam G generated from the steam generator 220 of the reactor 200 through the steam line P2.

The water drain line 540 has one end coupled with the feedwater line P1 and an opposite end coupled with a lower part of the condensation heat exchanger 520 to supply water condensed in the condensation heat exchanger 520 to the steam generator 220 of the reactor 200. The water drain line 540 may be mounted thereon with isolation valves 541, check valves 542, and an orifice 543.

Hereinafter, the operating procedure of the passive safety system of the integral reactor having the above structure according to the present invention will be described briefly with reference to FIGS. 2 to 7.

If the loss of coolant accident occurs due to line break, the water level and the pressure in the reactor 200 decrease, and the core 210 of the reactor 200 is shutdown according to a related signal.

If the loss of coolant accident occurs so that the pressure of the reactor 200 reaches the set point for the operation of the core makeup tank 400, the isolation valves 413 are open so that the high-temperature steam G or the water W generated from the reactor 200 flow into the core makeup tank 400 through the pressure balance line 620 and the second pressure balance line 420, and the water W stored in the core makeup tank 400 is supplied into the reactor 200 through the second safety injection line 410 and the safety injection line 610, thereby lowering the water level of the core makeup tank 400.

Then, if the actuation signal of the passive residual heat removal system 500 is generated, the isolation valves of the feedwater line P1 and the isolation valves of the steam line P2 are closed and the isolation valves 541 mounted on the water drain line 540 of the passive residual heat removal system 500 are open. Thereafter, the check valve 542 is open due to the flow resulting from gravity. Simultaneously, the high-temperature steam G generated from the steam generator 220 flows into the condensation heat exchanger 520 of the passive residual heat removal system 500 through the steam line P2 and the steam inlet line 530 and condensed, and water W in the emergency cooling tank 510 is heated and evaporated by transferred heat so that the water level of the emergency cooling tank 510 is gradually lowered.

Meanwhile, if the pressure of the reactor 200 is reduced to the set point or less for the operation of the safety injection tank 300, the isolation valves 322 mounted on the first pressure balance line 320 are automatically open, so that the high-temperature steam G flows into the safety injection tank 300 through the pressure balance line 620 and the first pressure balance line 320.

The high-temperature steam G flows into the safety injection tank 300 and pressure balance is made between the reactor 200 and the safety injection tank 300. If the pressure balance is made between inner parts of the safety injection tank 300 and the reactor 200, the water W in the safety injection tank 300 is supplied into the reactor 200 through the first safety injection line 310 and the safety injection line 610 due to a differential head resulting from gravity.

Figure 8:
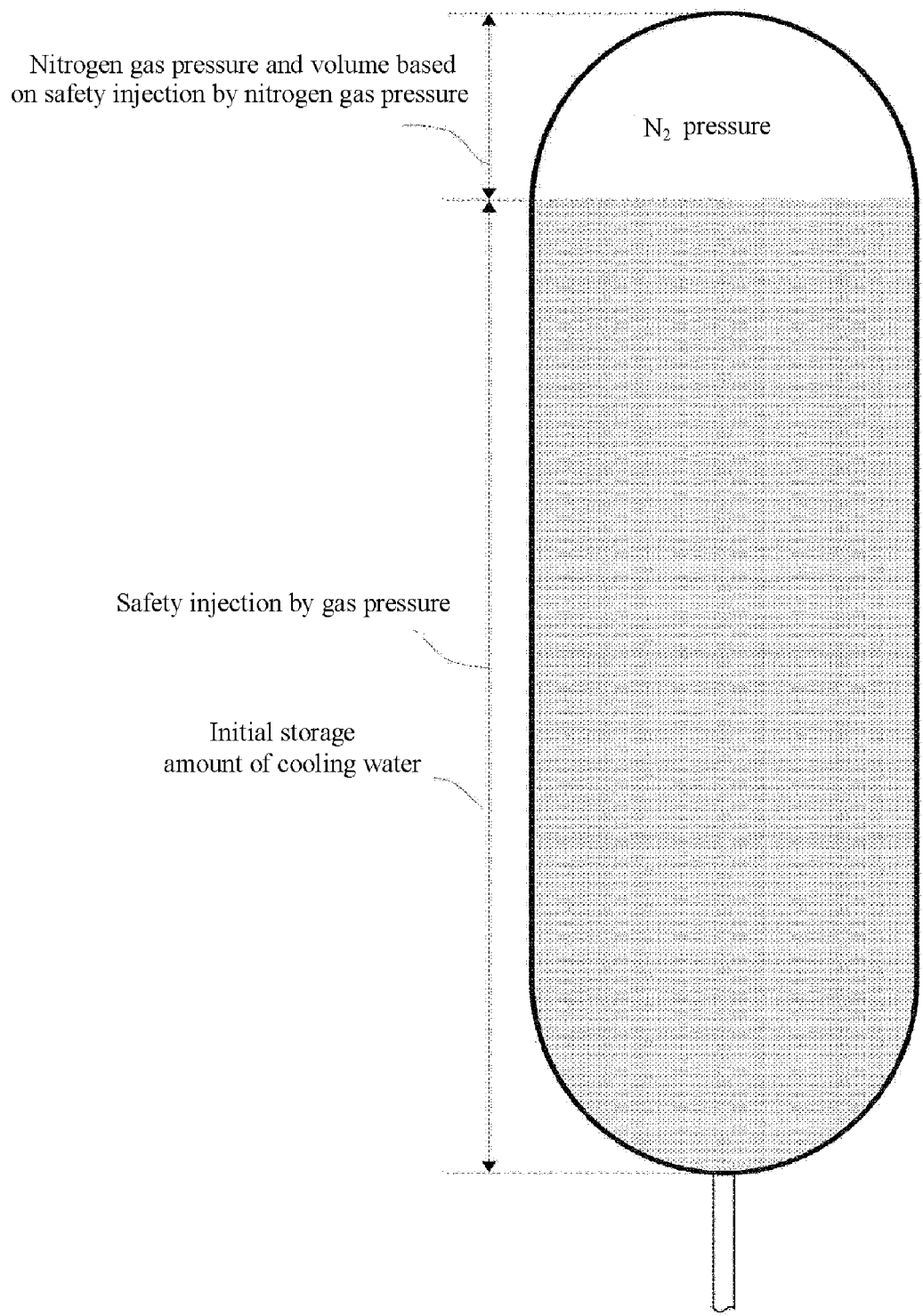
FIGS. 8 to 10 are schematic views showing a pressurized-type safety injection tank, a pressure balance-type (back pressure-type or gravity-type) safety injection tank, or a mixed-type safety injection tank in the passive safety system of the reactor according to the present invention
Figure 9:
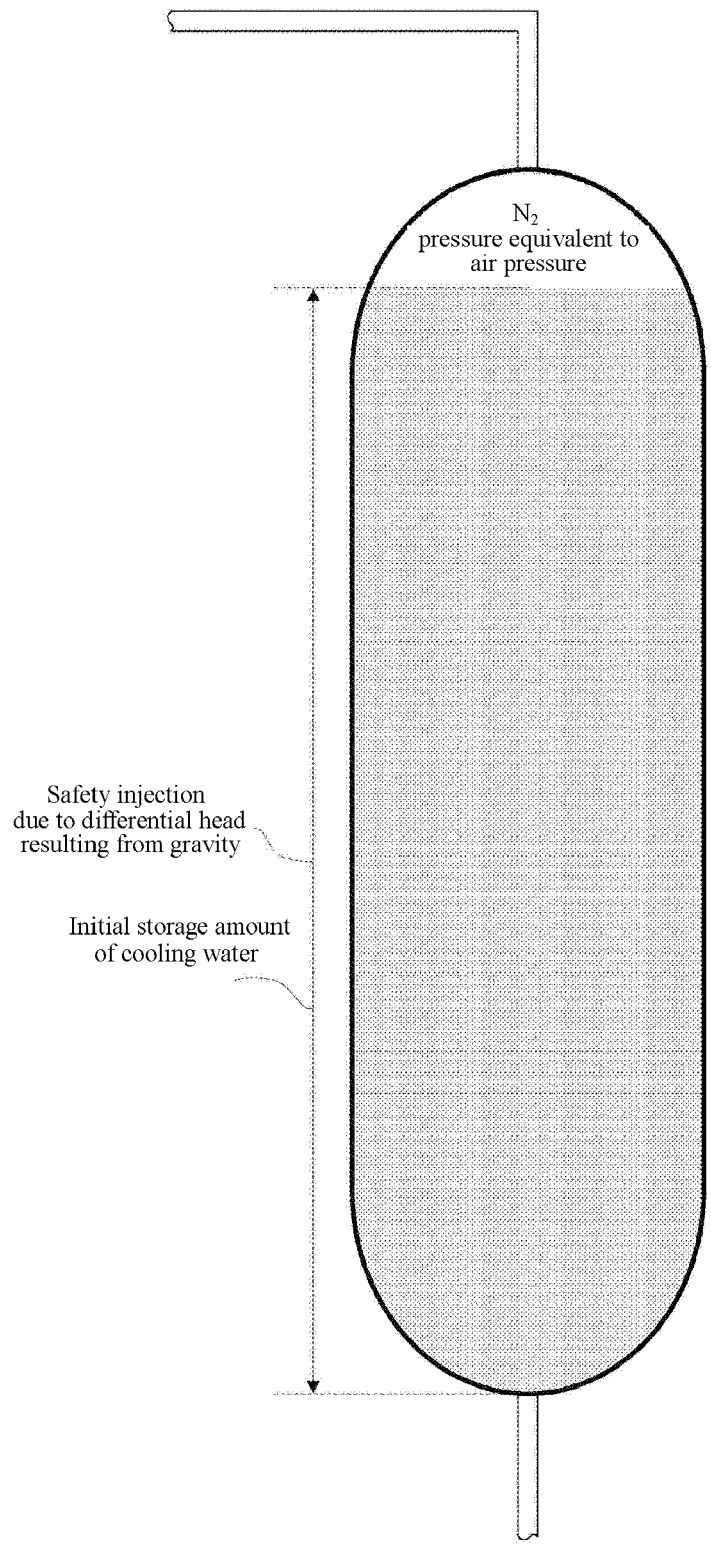
Figure 10:
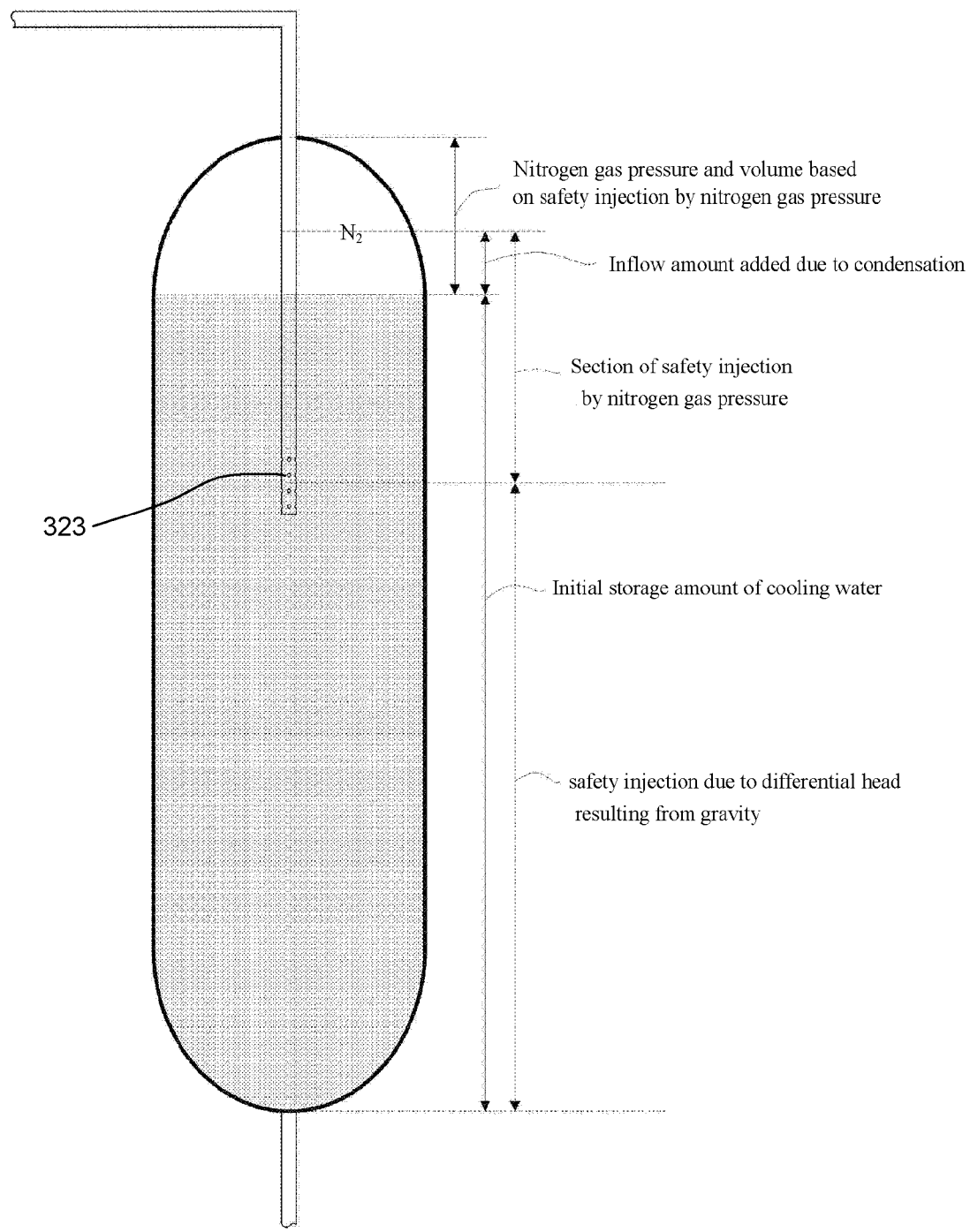

FIGS. 8 to 10 are schematic views showing a pressurized-type safety injection tank, a pressure balance-type (back pressure-type or gravity-type) safety injection tank, or a mixed-type safety injection tank in the passive safety system of the reactor according to the present invention.

The first pressure balance line 320 may not be mounted, or the end of the first pressure balance line 320 may be inserted into the water W stored in the safety injection tank 300, and may be provided therein with a plurality of perforating holes 323 according to the required characteristics of the nuclear power plant. The water W in the safety injection tank 300 is supplied into the reactor 200 while sequentially passing through the first safety injection line 310 and the safety injection line 610 due to the nitrogen gas pressure if the first pressure balance line 320 is not installed, and due to the differential head resulting from the nitrogen gas pressure and the gravity sequentially if the end of the first pressure balance line 320 is inserted into the water W in the safety injection tank 300.

As described above, the present invention is constructed by improving and applying a core makeup tank according to the related art based on characteristics required for safety injection into the integral reactor and a characteristic in which the pressure of the reactor is slowly reduced if the loss of coolant accident occurs in the integral reactor since a large loss of coolant accident cannot occur in the integral reactor when comparing with a loop type reactor in which the large loss of coolant accident may occur. In addition, the present invention is constructed by improving a pressurized-type safety injection tank according to the related art into various types of tanks and selectively applying the various types of tanks. In other words, the present invention is constructed by improving the core makeup tank and a pressurized-type safety injection tank, which are applied to a commercial reactor according to the related art, into various shape tanks based on the required characteristic (72-hour operation) of the integral reactor for safety injection and applying the improved tanks.

When the present invention employs a core makeup tank, the core makeup tank may be provided by modifying the flow resistance, a tank size, a tank height, a tank design, and the operating pressure of the core makeup tank, the position of a safety injection line, and the position of a pressure balance line (back pressure line) from those of a core makeup tank according to the related art, thereby satisfying the required characteristics of the integral reactor for safety injection.

When the present invention employs a pressurized-type safety injection tank, the pressurized-type safety injection tank may be provided by modifying the flow resistance, a tank size, a tank height, a tank design, and the operating pressure of the pressurized-type safety injection tank, and the position of a safety injection line from those of a pressurized-type safety injection tank according to the related art, thereby satisfying the required characteristics of the integral reactor for safety injection. In addition, when the present invention employs both of the core makeup tank and the pressurized-type safety injection tank, the core makeup tank and the pressurized-type safety injection tank are constructed to share the safety injection line together in order to reduce the probability of occurrence of a loss of coolant accident, and simplify the system.

Figure 11:
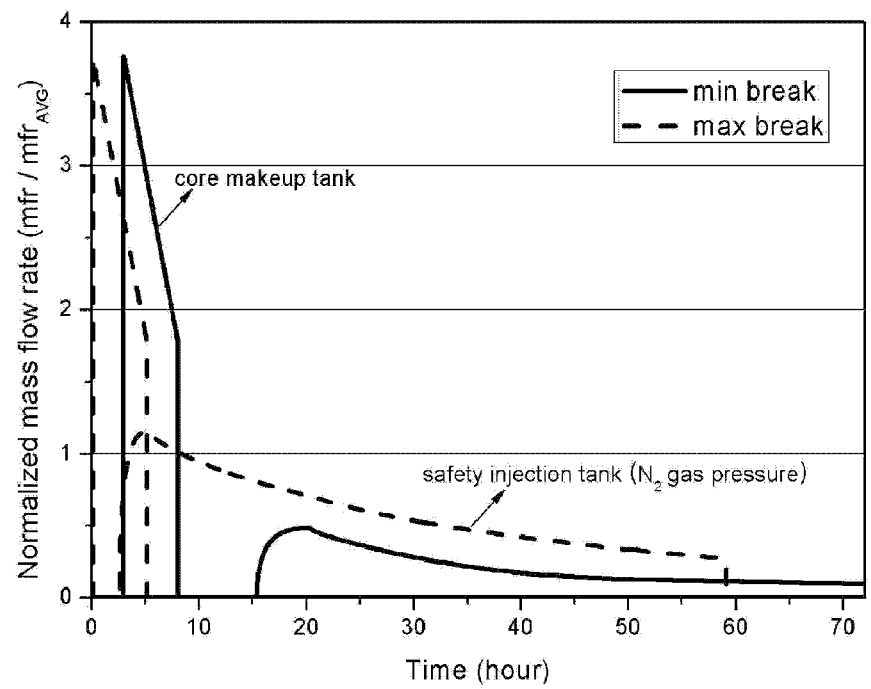
FIG. 11 shows graphs representing the variation in the safety injection flow rate and the water level of the reactor upon a loss of coolant accident when the core makeup tank and the pressurized-type safety injection tank according to the present invention are applied suitably to the integral reactor.
Figure 11:
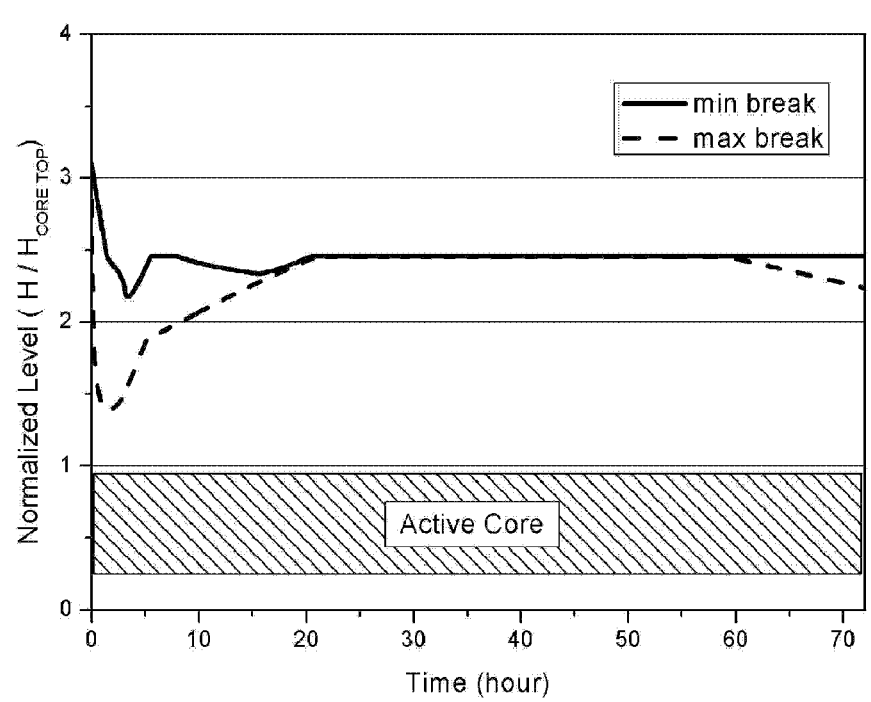

FIG. 11 shows graphs representing the variation in the safety injection flow rate and the water level of the reactor upon a loss of coolant accident when the core makeup tank and the pressurized-type safety injection tank according to the present invention are applied suitably for the integral reactor.

In addition, when the present invention employs a pressure balance-type (back pressure-type or gravity-type) safety injection tank, the safety injection tank is a modification into a pressure balance-type like the core makeup tank. In addition, the flow resistance, a tank size, a tank height, a tank design, and the operating pressure of the pressure balance-type safety injection tank are set to satisfy the required characteristics of the integral reactor for safety injection. Meanwhile, in this case, when the present invention employs both of the core makeup tank and the pressure balance-type safety injection tank, the core makeup tank and the pressure balance-type safety injection tank are constructed to share the pressure balance line (back pressure line) and the safety injection line together in order to reduce the probability of occurrence of the loss of coolant accident and simplify the system.

Figure 12:
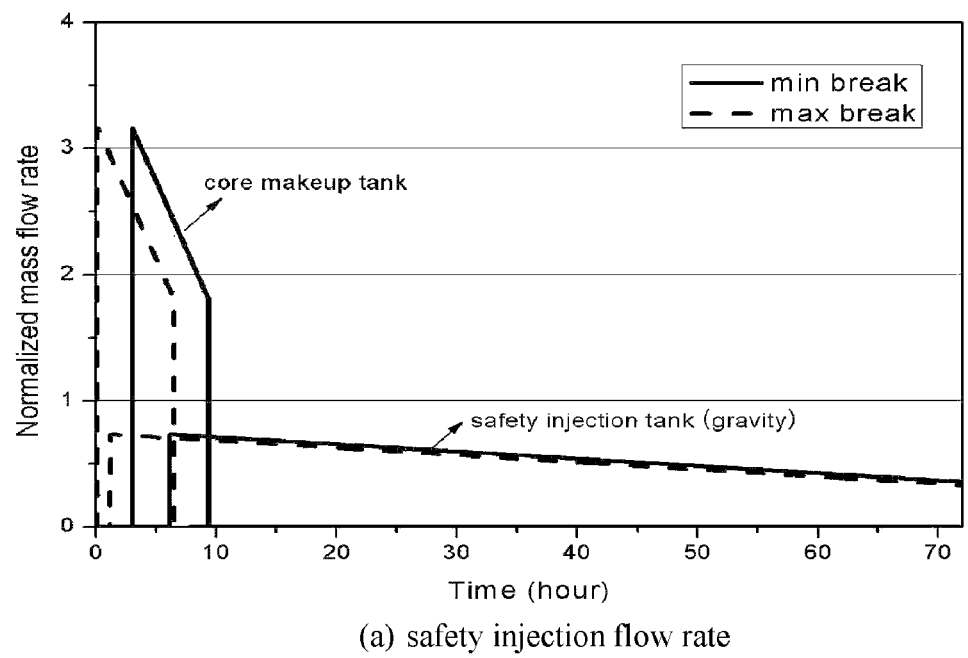
FIG. 12 shows graphs representing the variation in the safety injection flow rate and the water level of the reactor upon a loss of coolant accident when the core makeup tank and the pressure balance-type safety injection tank according to the present invention are applied suitably to the integral reactor.
Figure 12:
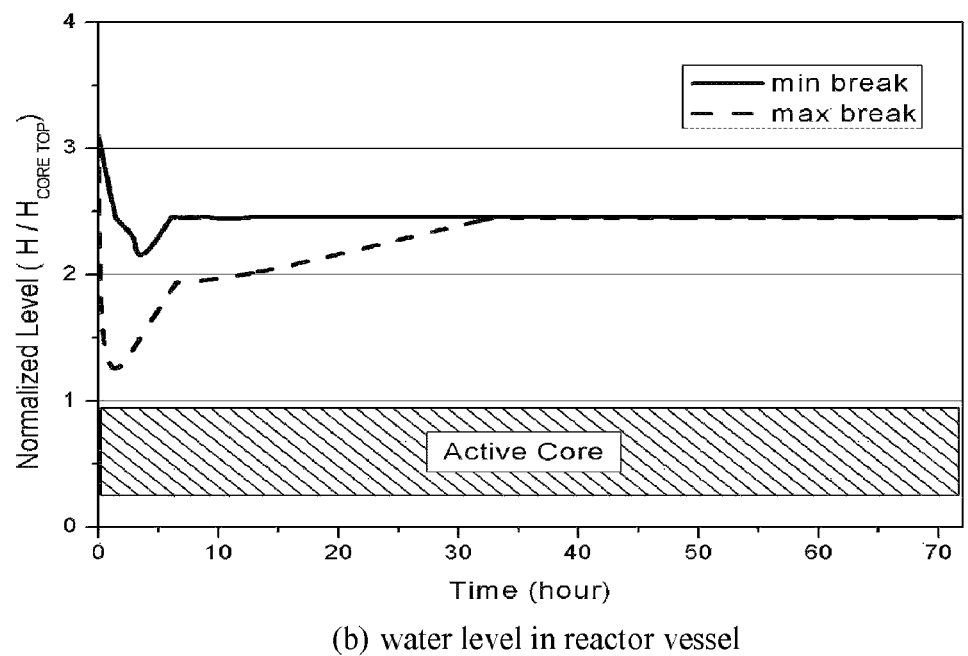

FIG. 12 shows graphs representing the variation in the safety injection flow rate and the water level of the reactor upon the loss of coolant accident when the core makeup tank and the pressure balance-type safety injection tank according to the present invention are applied suitably for the integral reactor.

In addition, when a mixed-type safety injection tank is employed according to the present invention, a safety injection tank is constructed in the mixed-type of pressurized-type and the pressure balance-type, and the passive safety system according to the present invention is constructed in such a manner that one type of a safety injection tank has high flow rate (a pressurized-type safety injection) and low flow rate (a pressure balance-type safety injection) characteristics by improving a high flow rate-medium flow rate-low flow rate safety injection system according to the related art. In this case, when the core makeup tank is employed together with the mixed-type safety injection tank, the core makeup tank and the mixed-type safety injection tank are constructed to share the pressure balance line (back pressure line) and the safety injection line together in order to reduce the probability of occurrence of the loss of coolant accident and the simplify the system.

Figure 13:
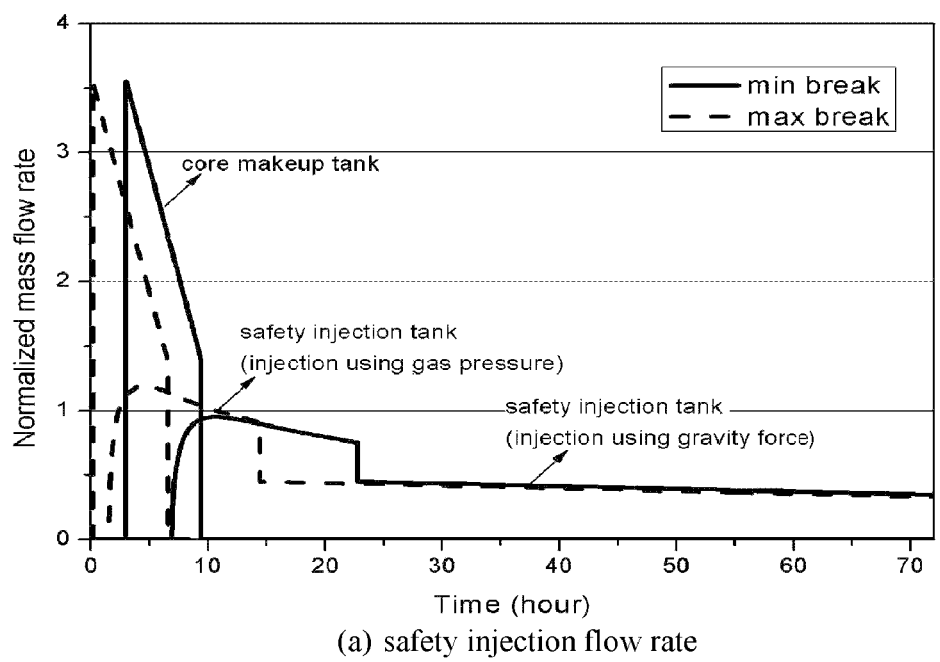
FIG. 13 shows graphs representing the variation in the safety injection flow rate and the water level of the reactor upon a loss of coolant accident when the core makeup tank and the mixed-type safety injection tank according to the present invention are applied suitably to the integral reactor.
Figure 13:
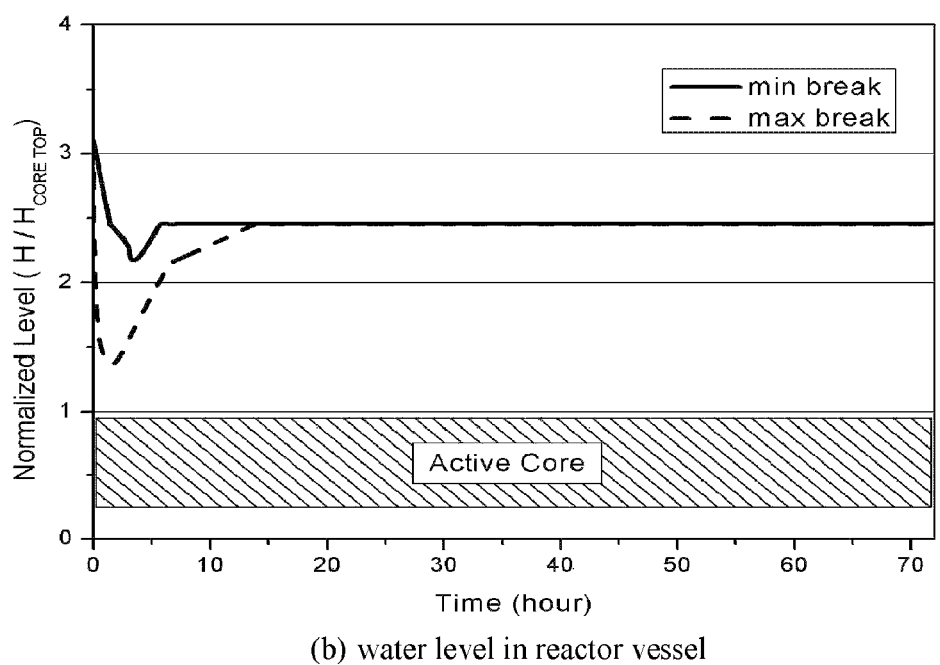

FIG. 13 shows graphs representing the variation in the safety injection flow rate and the water level of the reactor upon the loss of coolant accident when the core makeup tank and the mixed-type safety injection tank according to the present invention are applied suitably for the integral reactor.

As shown in FIGS. 11 to 13, when the combination of the core makeup tank and various types of safety injection tanks is applied, the core is covered well, and the safety injection can be properly performed upon the loss of coolant accident.

FIGS. 11 to 13 show only one of detailed embodiments according to the present invention. The safety injection performance may be improved or degraded according to design applications of the present invention, such as the design pressure, the operating pressure, the gas pressure, the fluid volume, the tank diameter, the tank height, the tank capacity, and the depth of an insertion of the first pressure balance line in the safety injection tank.

In addition, according to the present invention, a scheme of cooling a reactor by circulating secondary cooling water using a steam generator, which has been used in the SMART reactor of the related art, is improved by modifying the design of valve-based components by taking a single failure into consideration in such a manner that the modification is suitable for a design standard of a passive safety system.

When the passive safety injection system using the core makeup tank and the safety injection tank according to the present invention is used together with the passive residual heat removal system using steam generators, the maintenance in the water level of the reactor and the removal of the residual heat from the reactor required to safely maintain a reactor upon an accident can be passively realized.

Meanwhile, since the passive safety injection system can be realized in a very simple structure, various types of systems such as passive safety injection systems according to the related art are not required, thereby contributing to improvement of the safety and economical efficiency of the reactor.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A passive safety system of an integral nuclear reactor, the passive safety system comprising:

a containment;

a reactor installed inside the containment and filled therein with a reactor coolant;

a safety injection tank, filled therein with a first water and gas, the tank connected with the reactor through a first safety injection line and configured to supply the first water into the reactor through the first safety injection line and the safety injection line when a level of the reactor coolant in the reactor is lowered due to a loss of coolant accident;

a first pressure balance line interposed between the reactor and the safety injection tank, wherein one end of the first pressure balance line is coupled with an upper portion of the reactor, and wherein the other end of the first pressure balance line is coupled with an upper portion of the safety injection tank, inserted into the first water of the safety injection tank, and provided with a plurality of perforating holes;

a core makeup tank filled therein with boric acid water, the core makeup tank connected with the reactor through a second safety injection line and configured to supply the boric acid water into the reactor through the second safety injection line when the level of the reactor coolant in the reactor is reduced upon the loss of coolant accident or a non-loss of coolant accident; and a passive residual heat removal system connected with a feedwater line and a steam line, which are connected with a steam generator installed in the reactor to remove heat from the reactor upon the loss of coolant accident or the non-loss of coolant accident.

2. The passive safety system of claim 1, wherein the core makeup tank is further connected with the reactor through a second pressure balance line, the second safety injection line is mounted thereon with an isolation valve, and the isolation valve is open upon the loss of coolant accident or the non-loss of coolant accident such that high-temperature steam or reactor coolant from the reactor is supplied into the core makeup tank.

3. The passive safety system of claim 2, wherein the second pressure balance line is mounted thereon with an orifice.

4. The passive safety system of claim 1, wherein the passive residual heat removal system comprises:

an emergency cooling tank to store a second water therein;

a condensation heat exchanger provided in the emergency cooling tank; and a steam inlet line having one end coupled with the steam line and an opposite end coupled with the condensation heat exchanger to receive high-temperature steam through the steam line; and a water drain line having one end coupled with the feedwater line and an opposite end coupled with the condensation heat exchanger to supply the second water in the condensation heat exchanger to the steam generator of the reactor.

5. The passive safety system of claim 1, wherein the first safety injection line is mounted thereon with an orifice and a check valve.

6. The passive safety system of claim 1, wherein the second safety injection line is mounted thereon with an orifice and a check valve.

7. The passive safety system of claim 1, wherein the first pressure balance line is mounted thereon with isolation valves, such that the isolation valves are open upon the loss of coolant accident to supply high-temperature steam generated from the reactor into the safety injection tank.

8. The passive safety system of claim 7, wherein the first pressure balance line is mounted thereon with an orifice.

9. The passive safety system of claim 7, wherein the isolation valves includes two isolation valves, which are mounted on two branch lines, respectively, connected with the first pressure balance line such that the two isolation valves are independently operated.

10. The passive safety system of claim 7, wherein the isolation valves is configured to receive a backup power supply from a battery to open the first pressure balance line.

* * * * *